US008612993B2

(12) United States Patent
Grant et al.

(10) Patent No.: US 8,612,993 B2
(45) Date of Patent: Dec. 17, 2013

(54) IDENTITY PERSISTENCE VIA EXECUTABLE SCRIPTS

(75) Inventors: Euan Grant, Redmond, WA (US); Brendan Riordan-Butterworth, Seattle, WA (US); Amit Fulay, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1494 days.

(21) Appl. No.: 12/035,263

(22) Filed: Feb. 21, 2008

(65) Prior Publication Data
US 2009/0217301 A1    Aug. 27, 2009

(51) Int. Cl.
  *G06F 13/00* (2006.01)
  *G06F 17/30* (2006.01)
  *H04L 29/06* (2006.01)

(52) U.S. Cl.
  USPC ............... 719/311; 711/113; 713/155; 726/2; 726/26

(58) Field of Classification Search
  USPC .......... 711/113; 713/155; 719/311; 726/2, 26
  See application file for complete search history.

(56) References Cited

U.S. PATENT DOCUMENTS

| | | | |
|---|---|---|---|
| 6,314,565 B1 * | 11/2001 | Kenner et al. ................. | 717/171 |
| 6,553,409 B1 * | 4/2003 | Zhang et al. ................... | 709/213 |
| 7,191,467 B1 | 3/2007 | Dujari | |
| 7,225,256 B2 | 5/2007 | Villavicencio | |
| 7,305,470 B2 | 12/2007 | Tom | |
| 7,392,348 B2 * | 6/2008 | Dumont ........................ | 711/137 |
| 7,716,719 B2 * | 5/2010 | Kouznetsov et al. ............. | 726/2 |
| 2002/0013167 A1 * | 1/2002 | Spaur et al. ..................... | 463/11 |
| 2003/0182357 A1 * | 9/2003 | Chess et al. .................... | 709/203 |
| 2004/0015580 A1 * | 1/2004 | Lu et al. ......................... | 709/224 |
| 2004/0117486 A1 * | 6/2004 | Bourne et al. ................. | 709/228 |
| 2004/0128390 A1 | 7/2004 | Blakley | |
| 2005/0195076 A1 * | 9/2005 | McCulloch et al. .......... | 340/500 |
| 2005/0204041 A1 | 9/2005 | Blinn | |
| 2006/0095570 A1 | 5/2006 | O'Sullivan | |
| 2007/0078994 A1 * | 4/2007 | Wilson et al. ................. | 709/229 |
| 2007/0079361 A1 * | 4/2007 | Hays et al. ........................ | 726/5 |
| 2007/0101008 A1 | 5/2007 | Gomez | |
| 2007/0124480 A1 * | 5/2007 | Heled et al. ................... | 709/227 |
| 2007/0180048 A1 * | 8/2007 | Crick et al. .................... | 709/217 |
| 2007/0245407 A1 | 10/2007 | Lester | |
| 2007/0245409 A1 * | 10/2007 | Harris et al. ...................... | 726/5 |

FOREIGN PATENT DOCUMENTS

GB        2357599 A        6/2001

OTHER PUBLICATIONS

Cyberprivacy in the New Millenium—it doesn't look good from the U.S. perspective! http://www.berghel.net/publications/c_priv/c_privacy.php, Nov. 10, 2000.

* cited by examiner

*Primary Examiner* — Charles E Anya
(74) *Attorney, Agent, or Firm* — Shook, Hardy & Bacon L.L.P.

(57) ABSTRACT

Computing devices, computer-readable media, and methods are provided for generating and persisting a user identity associated with a client in a client-server network. A request for an identity script, the identity script comprising computer-executable instructions for creating one or more cookies, is sent from a client to a server. A dynamically generated identity script is returned to the client. User identities are persisted by utilizing cache validation to determine whether a new identity script should be generated.

13 Claims, 6 Drawing Sheets

IDENTITY PERSISTENCE VIA EXECUTABLE SCRIPTS

BACKGROUND

Many hosts of network sites utilize cookies that identify particular users for advertising targeting, content targeting and personalization of network sites. Cookies allow servers to deliver targeted content to a known user without the user having to be authenticated when visiting sites within a particular network. Cookies also allow for targeting and personalization even when the user is not logged in. However, with the advent of new browser features, users are better able to control the creation and destruction of cookies. Consequently, cookies are not as persistent as they used to be, which compromises the ability of a network site host to personalize a user's experience as well as the ability to effectively target advertising and other content.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to methods for generating and persisting user identities in client-server networks. User identities may be generated at a client by executing an identity script that is inaccessible to the user and that has identity values hard-coded therein. The identity values may be written into identity cookies that are stored in the client's cache.

Further embodiments of the present invention allow for persisting user identities by updating identity values contained within identity cookies so that the identity values match identity values that are hard-coded into an identity script. The identity script may update identity cookies by overwriting identity cookies with hard-coded identity values.

According to an embodiment of the invention, a computing device may be provided that facilitates generating and persisting user identities. The computing device may comprise an input/output component for receiving requests for identity scripts from clients and for transmitting identity scripts to clients. The computing device may further comprise a script generation component that generates identity scripts and a cache validation component that compares identity cookies with hard-coded identity values to determine whether the identity cookies should be updated.

These and other aspects of the invention will become apparent to one of ordinary skill in the art upon a reading of the following description, drawings, and the claims.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Figure 1:
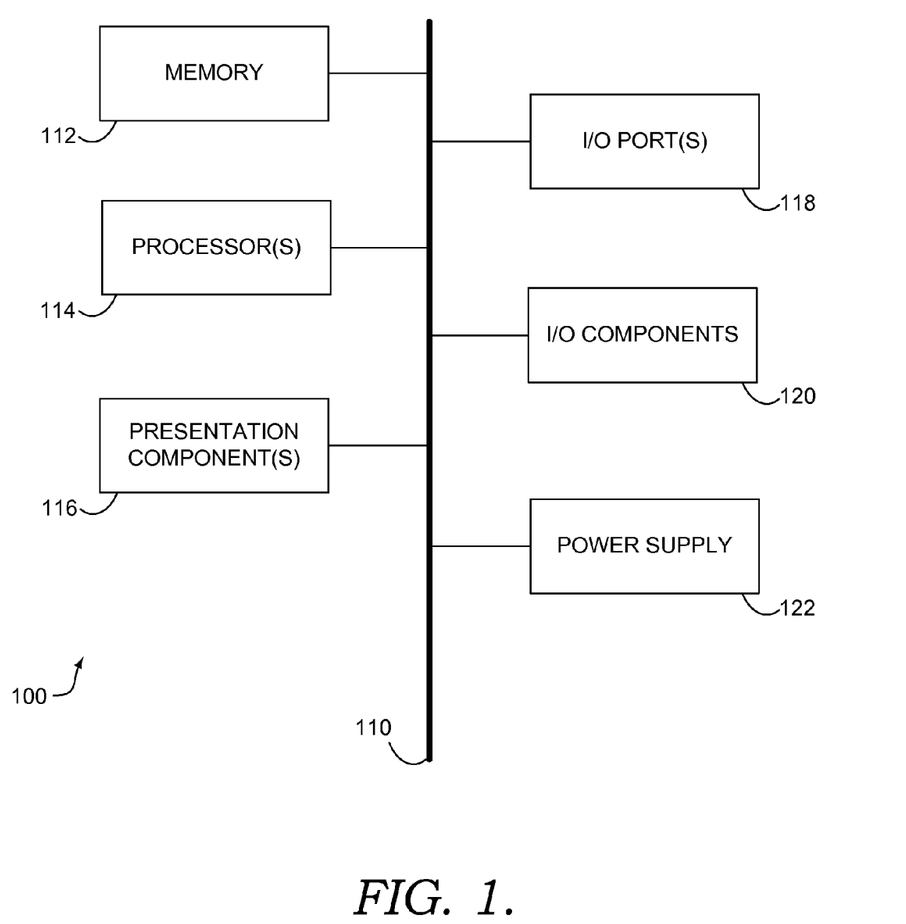
FIG. 1 is a block diagram of an exemplary computing environment suitable for use in implementing the present invention.

An exemplary operating environment in which various aspects of the present invention may be implemented is described below in order to provide a general context for various aspects of the present invention. Referring initially to FIG. 1, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated. In one embodiment, computing device 100 is a personal computer. But in other embodiments, computing device 100 may be a cell phone, smartphone, digital phone, handheld device, BlackBerry®, personal digital assistant (PDA), or other device capable of executing computer instructions.

The invention may be described in the general context of computer code or machine-useable instructions, including computer-executable instructions such as program modules, being executed by a computer or other machine, such as a PDA or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media. Computer storage media includes both volatile and nonvolatile, removable and non-removable media implemented in any method or technology for storage of information such as computer-executable instructions, data structures, program modules or other data. Computer readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
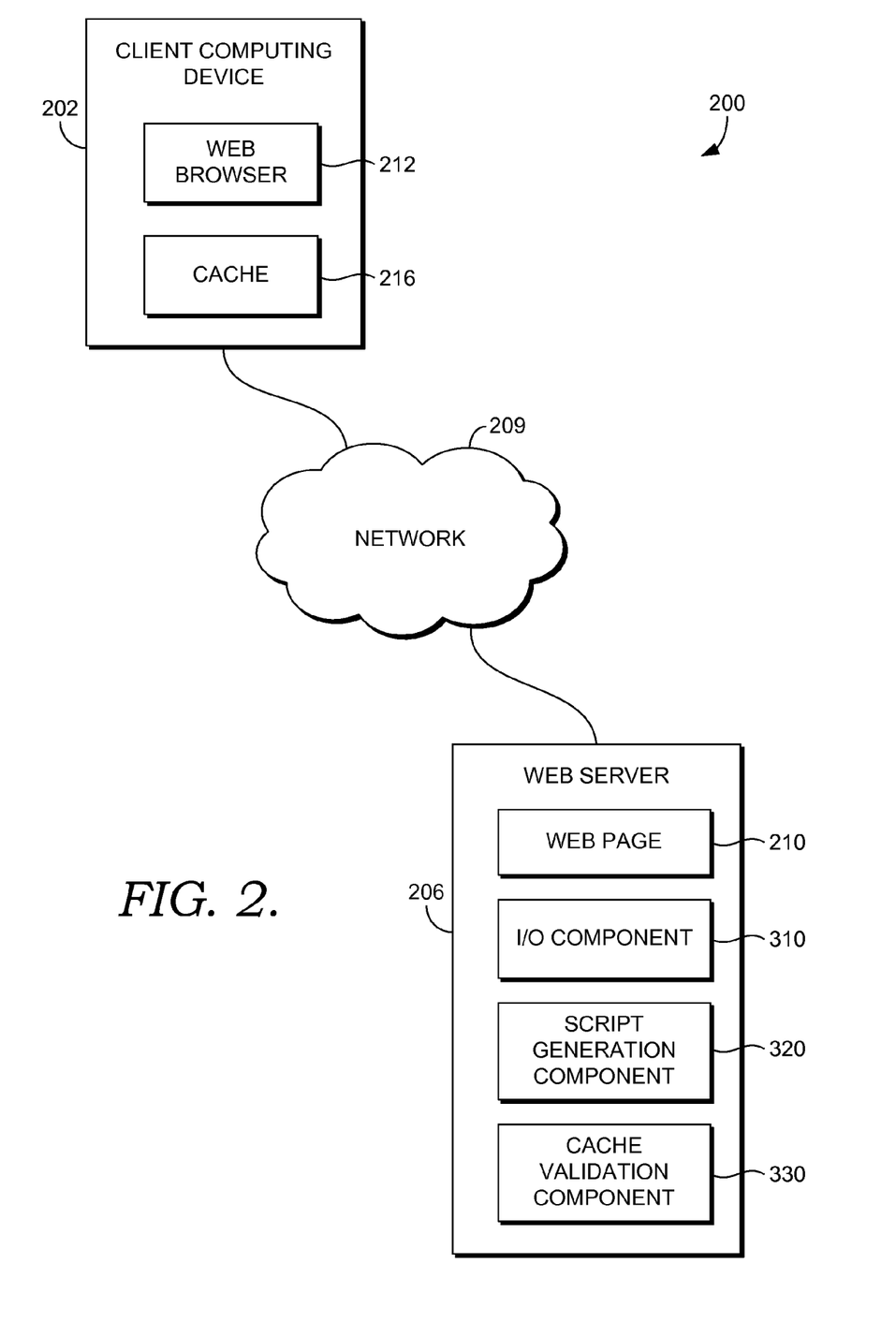
FIG. 2 is a block diagram of an exemplary networked computer system in accordance with an embodiment of the present invention.

Turning now to FIG. 2, a block diagram depicting a client-server networking architecture 200 is shown for use in implementing an embodiment of the present invention. The networking architecture 200 comprises a client computing device 202 and a web server 206, both of which communicate via network 209. Networking architecture 200 is merely an example of one suitable networking environment and is not intended to suggest any limitation as to the scope of use or functionality of the present invention. Neither should networking architecture 200 be interpreted as having any dependency or requirement related to any single component or combination of components illustrated therein.

Network 209 may include any computer network or combination thereof. Examples of computer networks configurable to operate as network 209 include, without limitation, a wireless network, landline, cable line, fiber-optic line, local area network (LAN), wide area network (WAN), metropolitan area network (MAN), or the like. Network 209 is not limited, however, to connections coupling separate computer units. Rather, network 209 may also comprise subsystems that transfer data between servers or computing devices. For example, network 209 may also include a point-to-point connection, the Internet, an Ethernet, a backplane bus, an electrical bus, a neural network, or other internal system.

In an embodiment where network 209 comprises a LAN networking environment, components are connected to the LAN through a network interface or adapter. In an embodiment where network 209 comprises a WAN networking environment, components use a modem, or other means for establishing communications over the WAN, to communicate. In embodiments where network 209 comprises a MAN networking environment, components are connected to the MAN using wireless interfaces or optical fiber connections. Such networking environments are commonplace in offices, enterprise-wide computer networks, intranets, and the Internet. It will be appreciated that the network connections shown are exemplary and other means of establishing a communications link between the computers may also be used.

The client computing device 202 may be any type of computing device, such as device 100 described above with reference to FIG. 1. By way of example only but not limitation, the client computing device 202 may be a personal computer, desktop computer, laptop computer, handheld device, cellular phone, digital phone, smartphone, PDA, or the like. But it should be noted that embodiments of the present invention are not limited to implementation on such computing devices.

In an embodiment, the client computing device 202 comprises a web browser 212 and a cache 216. The web browser 212 is a software application enabling a user to display and interact with information located on a web page. In an embodiment, the web browser 212 communicates with the web server 206 and other components accessible over the network 209. Web pages may be located by the web browser 212 by sending a transfer protocol and the Uniform Resource Identifier (URI). The web browser 212 may use various URI types and protocols, such as hypertext transfer protocol (HTTP), file transfer protocol (FTP), real-time streaming protocol (RTSP), etc. The web browser 212 can also execute a number of markup languages (e.g., hypertext markup language (HTML) and extensible markup language (XML)) as well as scripting languages (e.g., JavaScript or Visual Basic Scripting Edition (VBScript)).

The cache 216 may be used to store information related to web pages and the networking behavior of the client machine. Such information may be stored in the cache 216 temporarily or permanently. By way of example, and not limitation, the cache 216 may store portions of a web page to assist in efficiently rendering the web page in the future. The cache 216 may also contain various types of cookies, which may identify the user, the client machine 202, or the server 206, and which may be changed, updated, or deleted.

A cookie is a small text file that is often times stored on a computer to facilitate a more personalized experience. Identity cookies, as the term is used herein, typically uniquely identify a user and may also provide personally identifiable information (PII) including, but not limited to, one or more of a user name, postal address, email address, phone number, social security number, credit card information and preferences. For example, in one embodiment, an identity cookie may consist of an anonymous identifier that is a one way hash of a user's login identifier. In an embodiment of the present invention, the first time a user visits a website, the website can cause an identity cookie to be stored in the cache 216 on the client device 202. The user can then be followed or tracked on subsequent visits. Most browsers provide the ability to block cookies. However, blocking cookies is not without its costs, for instance with respect to loss of functionality and/or personalization.

The web server 206 is a computing device and may include any type of application server, database server, or file server configurable to perform the methods described herein. In addition, the web server 206 may be a dedicated or shared server. The server may also be configured to run various operating systems well known to those of skill in the art, including, for example, the Microsoft Windows®, MaOS™, BeOs™, Mach, Apache, OpenStep™, etc. In an embodiment, two or more servers may be directly or indirectly connected to each other without using network 209.

Components of the web server 206 may include, without limitation, a processing unit, internal system memory, and a suitable system bus for coupling various system components, including one or more databases for storing information (e.g., files and metadata associated therewith). Each server typically includes, or has access to, a variety of computer-readable media and communication media. By way of example, and not limitation, computer-readable media may include computer-storage media. In general, communication media enables each server to exchange data via network 209. While the web server 206 is illustrated as a single box in FIG. 2, one skilled in the art will appreciate that the web server 206 is scalable. For example, the web server 206 may in actuality include 100 servers in communication. The single unit depictions are meant for clarity, not to limit the scope of embodiments in any form.

Web pages 210 are stored on the web server and accessible via the network 209 using a transfer protocol and relevant Uniform Resource Identifier (URI). The client computing device 202 may fetch a web page 210 by requesting the relevant URI using the transfer protocol. As a result, the web page 210 can be downloaded to the client computing device 202 and stored in memory. The stored web page 210 can then be rendered by the web browser 212 and presented to a user.

As previously mentioned, in one embodiment, the present invention relates to generating and persisting user identities by executing an identity script that writes identity cookies and stores the identity cookies in a cache at the client. Another embodiment relates to a mechanism for persisting user identities by determining whether identity cookies should be updated.

Figure 3:
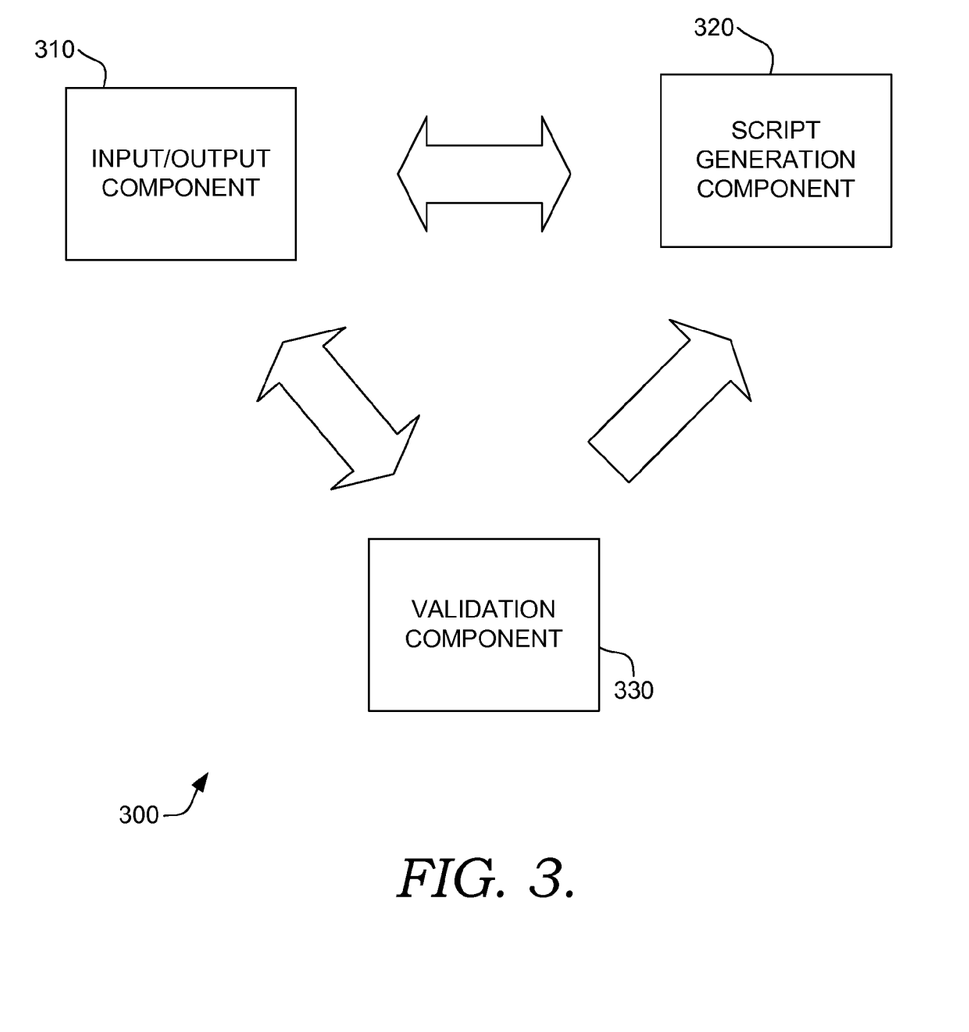
FIG. 3 is a block diagram of a portion of an exemplary server computing device in accordance with an embodiment of the present invention.

Turning to FIG. 3, a block diagram is shown, illustrating the relevant components of an exemplary server computing device 300 according to an embodiment of the present invention. An input/output component 310 is shown, and is operable to receive a request for an identity script from a client. A request for an identity script may be of any form known in the art such as, for example, an HTTP request, and may include one or more headers such as, for example, cookie headers and/or validation headers. The input/output component 310 is further operable to transmit messages and identity scripts to a client.

The computing device of FIG. 3 may further comprise a script generation component 320. The script generation component 320 is operable to dynamically generate an identity script. An identity script is a piece of code executable by a client browser. The code that defines an identity script may be written in any number of scripting languages. For example, in one embodiment, identity scripts are written in the JavaScript programming language.

An identity script, when executed, may perform a variety of tasks, including, but not limited to, writing identity cookies and storing them in a cache at the client. An identity script may also have hard-coded identity values, which are identity values embedded in the script's code that correspond to a particular user. According to an embodiment of the present invention, upon execution, an identity script can determine whether there are identity cookies stored in the client browser cache, and if so, whether the identity values contained within those cookies match the hard-coded identity values written into the identity script. In further embodiments, an identity script may also be operable to determine whether to trust identity cookies that contain identity values that differ from the hard-coded identity values. In still further embodiments, an identity script may be operable to overwrite existing identity cookies with identity values that match the hard-coded identity values contained within the script.

In an embodiment of the present invention, the identity script is configured to execute within a closure. A closure is a function or program that operates in isolation from the application in which it is executed. For example, an identity script may be executed in an environment that contains one or more variables that are accessible only to the executing identity script. In one embodiment of the present invention, the identity script may utilize a set of private variables which persist over each invocation of the identity script, but which are not accessible from any other program code. In other embodiments, the identity script may be configured to use local variables, but are only executable and accessible by the client computing device or client browser. In various embodiments, the identity script is not visible to a user of a client, and may not be altered or deleted by a user or any entity other than the server that generated the identity script.

Additionally, in various embodiments of the present invention, the identity script may be prevented from being executed within the context of unauthorized server environments. For example, in one embodiment, when a server sends an identity script to a client, the server may include a list of authorized domains. In one embodiment, the list of authorized domains may be independent of the script and passed as a separate file. In another embodiment, the list of authorized domains may be an internal component of the script, and is therefore passed within the script. The list of authorized domains may include only those domains within which the identity script can be executed.

Upon execution, the identity script may compare the list of authorized domains to the domain in which it is being executed. If the domain in which the script is being executed is on the list of authorized domains, the script may continue to execute normally. However, if the domain in which the script is being executed is not on the list of authorized domains, the script may terminate execution and prevent further attempts to execute within that domain.

According to an embodiment of the present invention, the identity script may be generated either with or without hard-coded identity values. If one or more identity cookies is present in the cookie header, the script generation component 320 may extract the identity value from the identity cookies and hard-codes that identity value into the identity script. If no identity cookies are included with the request for an identity script, the script generation component 320 may generate an identity script, which has no hard-coded identity values, but which is configured to be overwritten with such values when they are available.

In an embodiment of the present invention, the identity script is generated using an identity script shell, or base script. This identity script shell comprises the necessary code to enable it to perform the desired operations, but does not contain hard-coded identity values. If an identity value is provided to the script generation component 320 through an identity cookie header, the script generation component 320 may hard-code that identity value into a script shell, thus creating an identity script that is unique to the user or client. If the script generation component 320 does not receive an identity value, it may simply modify the script shell in any way necessary to enable its execution on the client and configure the script to be able to be hard-coded with identity values in the future.

The script generation component 320 may further generate one or more headers to control the operation and maintenance of the identity script when it is stored at the client. In an embodiment, the script generation component 320 may generate a control header, such as an expiry header, that is operable to inform the client when the identity script has expired. The expiry header may be set to allow the identity script to be run for any desired amount of time. For example, in an embodiment, the server may wish to refresh the identity script every three days. In that case, the expiry header would be operable to prevent the script from fully executing on a client after a period of three days from the time that the client receives the identity script, at which time the client may be prompted to request another identity script.

In addition to an identity script and a control header, the script generation component 320 may also generate an identity response header. In an embodiment, the script generation component 320 generates an identity response header if the identity script contains a hard-coded identity value. The identity response header may contain an identity value identical to the identity value hard-coded into the script. In one embodiment, the identity response header may be, for example, an entity tag (ETag), which is an HTTP response header returned by a server and used by a client to determine whether content at a given uniform resource locator (URL) has changed. In an embodiment of the present invention, an identity response header may be used by the client browser to determine whether the identity value contained in any identity cookies stored in the client's cache matches the identity value hard-coded into the identity script. In a further embodiment of the present invention, if there is no identity value hard-coded into the script, the script generation component 320 may generate an empty identity response header. In still a further embodiment, the script generation component 320 may not generate any identity response header.

The computing device 300 may further comprise a validation component 330 that is operable to determine whether a new identity script should be generated or whether the existing identity script should be preserved. The validation component 330 compares identity values contained in identity cookies with identity values that are hard-coded in an identity script. If the two values are the same, the validation component 330 instructs the input/output component 310 to send a response to the client instructing the client to continue to use the existing identity script. In an embodiment of the present invention, the response may be sent with an updated control header that instructs the client browser to request a cache validation at some predetermined time in the future. If the identity value contained in the one or more cookies does not match the identity value contained in the validation header, the validation component 330 may direct the script generation component 320 to generate a new identity script that reflects the identity value of what may be a new user.

Figure 4:
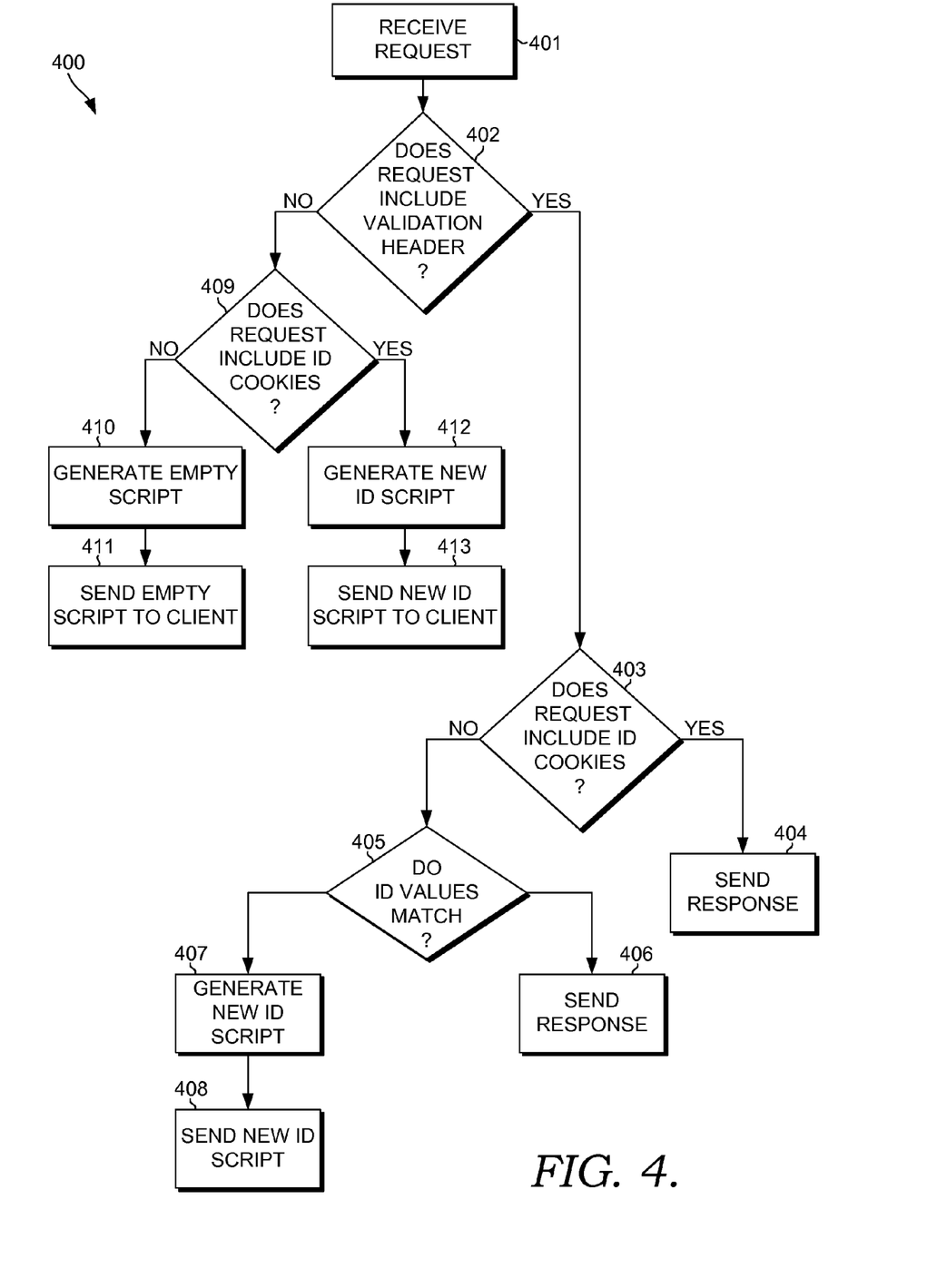
FIG. 4 is a flow diagram illustrating an exemplary method for generating and persisting a user identity in accordance with an embodiment of the present invention.

Turning to FIG. 4, a flow diagram is shown which illustrates an exemplary method 400 for generating and persisting a user identity by performing operations at a server in accordance with an embodiment of the present invention. Initially, at step 401, a request for an identity script is received from a client. As mentioned previously, the request may include one or more headers, such as cookie headers or a validation header. Upon receiving the request for an identity script, the server determines, at step 402, whether the request includes a validation header.

A validation header is a header associated with the request for a new identity script. A validation header may contain an identity value. In one embodiment of the present invention, for example, a validation header may comprise an If-None-Match header, which is an HTTP header that can be used to make a method conditional. For example, the If-None-Match header can be used to efficiently update cached information. In an embodiment of the present invention, the validation header is generated at the client in response to receipt of an identity response header, e.g. an ETag. The identity value that is passed to the client in the identity response header is copied into a validation header which can then be sent along with a request for an identity script. A client has requested a cache validation when the client has requested that the server determine whether the hard-coded values in an existing identity script match the identity values contained within one or more identity cookies stored in the client's cache.

If the request for an identity script includes a validation header, the server determines, at step 403, whether the request for an identity script includes any cookie headers that contain identity cookies. If no identity cookies are included with the request, the server sends a response to the client, as indicated at step 404. This response may include instructions to retain the existing identity script. In various embodiments of the present invention, the response may include a new control header and/or a new identity response header. Additionally, the response may include instructions that direct the client to execute the existing identity script to write identity cookies for storage in the client's cache.

If the request for an identity script includes one or more identity cookies, the server extracts the identity value from the one or more identity cookies and compares that identity value, at step 405, to the identity value contained within the validation header. If the two identity values are the same, the server may send a response, at step 406, to the client that instructs the client to retain the existing identity script. As with the response described above, this response may include a new control header and/or a new identity response header. Additionally, the response may include instructions that direct the client to execute the existing identity script to write identity cookies for storage in the client's cache.

As illustrated at step 407 of FIG. 4, if the identity value contained in the one or more cookies does not match the identity script contained in the validation header, the server generates a new identity script. The identity value contained within the one or more identity cookies is hard-coded into the new identity script. As indicated at step 408, the server then sends the new identity script to the client. The new identity script may be sent along with one or more headers, including a control header and an identity response header.

In another embodiment of the present invention, a server may not prefer to persist the most recent user identity, but may instead prefer to persist a previously detected user identity. In that case, if the identity value contained in the one or more identity cookies does not match the identity value contained in the validation header, the server may send a response to the client instructing the client to retain the existing identity script. As before, the response may include a new control header and/or a new identity response header. Additionally, the response may include instructions that direct the client to execute the existing identity script to overwrite the identity cookies with the hard-coded identity value.

With continued reference to FIG. 4, if the server determines at step 402 that the request does not include a validation header, the server then determines, at step 409, whether the request includes one or more cookie headers that contain at least one identity cookie. It will be understood by those skilled in the art that such a request may contain numerous cookie headers, each of which containing cookies that reflect various types of information, and that identity cookies are but one example.

If the request for an identity script does not include at least one identity cookie, the server generates a new identity script, as shown at step 410, that does not contain any identity values. An identity script that does not contain identity values may be referred to as an empty identity script. The empty identity script generated at step 410 is configured to be overwritten in the future with a new identity script that does contain identity values. Although the empty identity script does not contain identity values, it does contain the necessary code to allow the client browser to execute the script and perform various operations related to the methods described herein. The functionality of the identity script will be explained in more detail below. After generating the empty identity script, the server sends the empty identity script to the client, as indicated at step 411. Additionally, the server may send a control header directing the client to request a cache validation in the future that will cause the server to overwrite the empty identity script with a new identity script containing hard-coded identity values. In an embodiment of the present invention, the server may also send a list of authorized domains within which the identity script is authorized to execute.

If, at step 409, the server determines that the request for an identity script contains at least one identity cookie, a new identity script is generated at step 412. The server hard-codes the identity value contained within the at least one identity cookie into the new identity script. This identity script is sent to the client, as indicated at step 413, and may include one or more headers. The server may include a control header that directs the client to request a cache validation at some predetermined time in the future. Additionally, the server may include an identity response header that contains an identity value matching the identity value that is hard-coded into the identity script. It will be readily appreciated by those skilled in the art that methods similar to the one illustrated in FIG. 4 may be practiced with any number of modifications and may not necessarily be performed in the same order as described in FIG. 4 and the preceding text. The methods described herein are intended to be exemplary in nature and are not intended to be limited to being necessarily performed in the order described herein.

Figure 5:
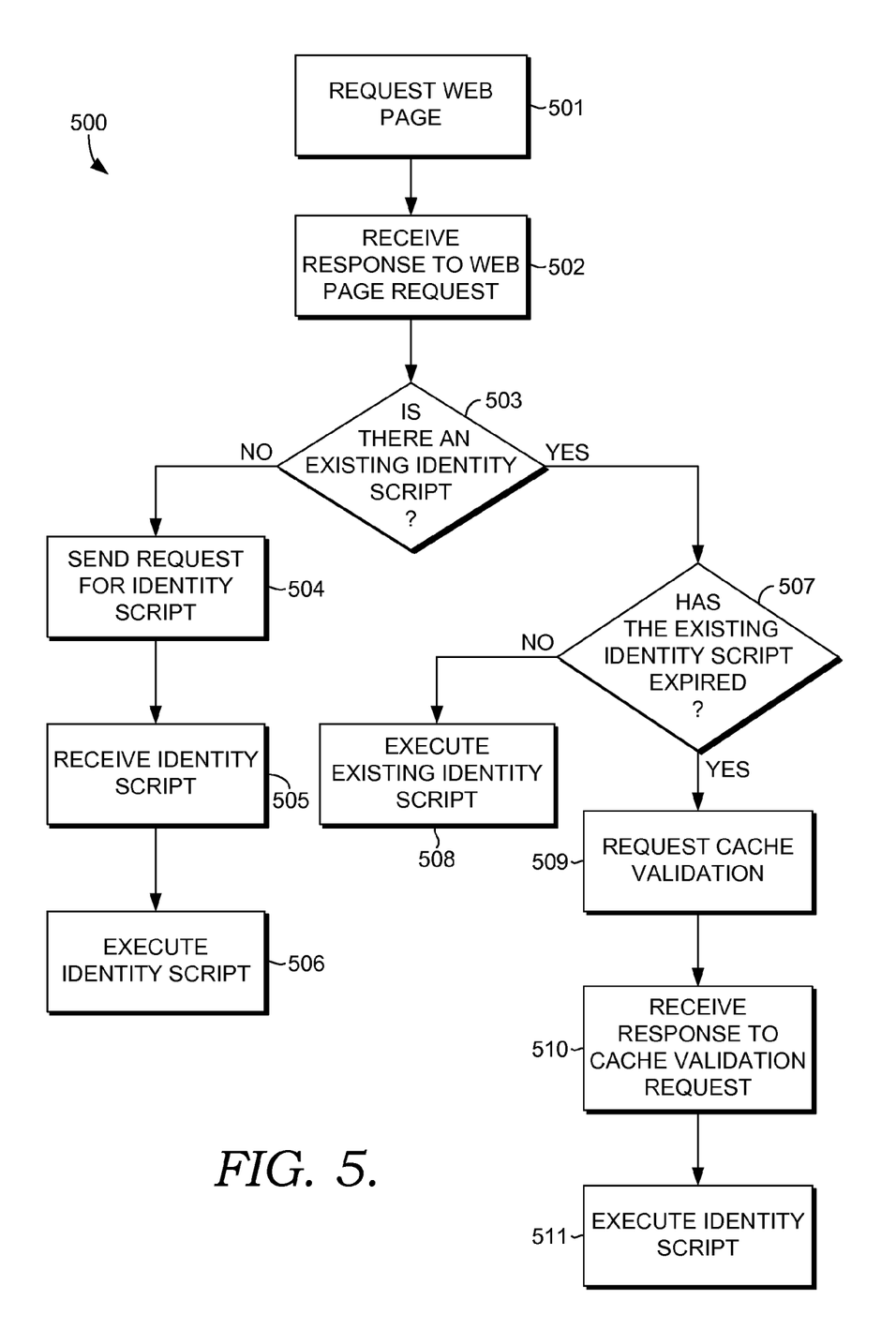
FIG. 5 is a flow diagram illustrating an exemplary method for generating and persisting a user identity at a client in accordance with an embodiment of the present invention.

Turning now to FIG. 5, a flow diagram is shown which illustrates an exemplary method 500 for persisting a user identity at a client in accordance with an embodiment of the present invention. Initially, at step 501, the client sends a request for a web page to a server. A web page is but one of many forms of content, or documents, that a client may request and receive from a server. The request described herein is intended only as an example of the types of requests that are typically transmitted from clients to servers.

At step 502, the client receives a response to the request. As will be appreciated by those skilled in the art, the nature of this response will depend upon the type of request to which it is responsive. In the case of the example in FIG. 5, the response is received in response to a request for a web page. That response may include further instructions that direct the client to send further requests for particular content, scripts, or other items that enable the client browser to render the web page. In an embodiment of the present invention, the response received at step 502 includes an instruction directing the client to send a request for an identity script to the server, which may require the client to first determine whether there exists an identity script stored in the client's cache.

At step 503, the client determines whether there is an existing identity script stored in the client's cache. If there is not an identity script stored in the cache the client sends a request for an identity script to the server, as illustrated at step 504. This request may contain one or more headers, including, but not limited to, one or more cookie headers. If there are any identity cookies stored in the client's cache, these cookies will be sent with the request to the server.

As shown at step 505, the client subsequently receives from the server an identity script. The identity script received at step 505 may include one or more headers such as, for example, a control header. Additionally, if the request that the client sent at step 504 included one or more identity cookies, the identity script received at step 505 may include an identity response header that contains an identity value matching the identity value contained in the one or more identity cookies. In one embodiment, the client may also receive a list of domains within which the identity script is authorized to execute. Further, the identity script received at step 505 may be empty, or it may contain hard-coded identity values. After receiving the identity script, the client executes the identity script, as shown at step 506 in FIG. 5.

If, at step 503, the client determines that there is an existing identity script stored in the client's cache, the client determines, at step 507, whether the existing identity script has expired. The client reads the control header that was passed to the client with the existing identity script to make this determination. If the control header indicates that the expiry has not occurred, the client executes the script at step 508. However, if the existing identity script has expired, the client sends a cache validation request to the server, as indicated at step 509. The cache validation request includes a validation header in addition to a request for an identity script.

As shown at step 510, the client receives a response to the cache validation request. The response received at step 510 may comprise an identity script hard-coded with an identity value or the response may comprise an empty identity script. Additionally, the response received at 510 may comprise an instruction directing the client to retain an existing identity script. The response may further include one or more headers, including a control header and/or a validation header. If the response received at 510 comprises an identity script, the client executes that identity script at step 511. Similarly, if the response received at step 510 comprises an instruction to retain an existing identity script, the client executes the existing identity script at step 511. Upon execution, the identity script may perform one of many operations, including, but not limited to, one similar to the exemplary method described below.

It will be readily appreciated by those skilled in the art that methods similar to the one illustrated in FIG. 5 may be practiced with any number of modifications and may not necessarily be performed in the same order as described in FIG. 5 and the preceding text. The methods described herein are intended to be exemplary in nature and are not intended to be limited to being necessarily performed in the order described herein.

Figure 6:
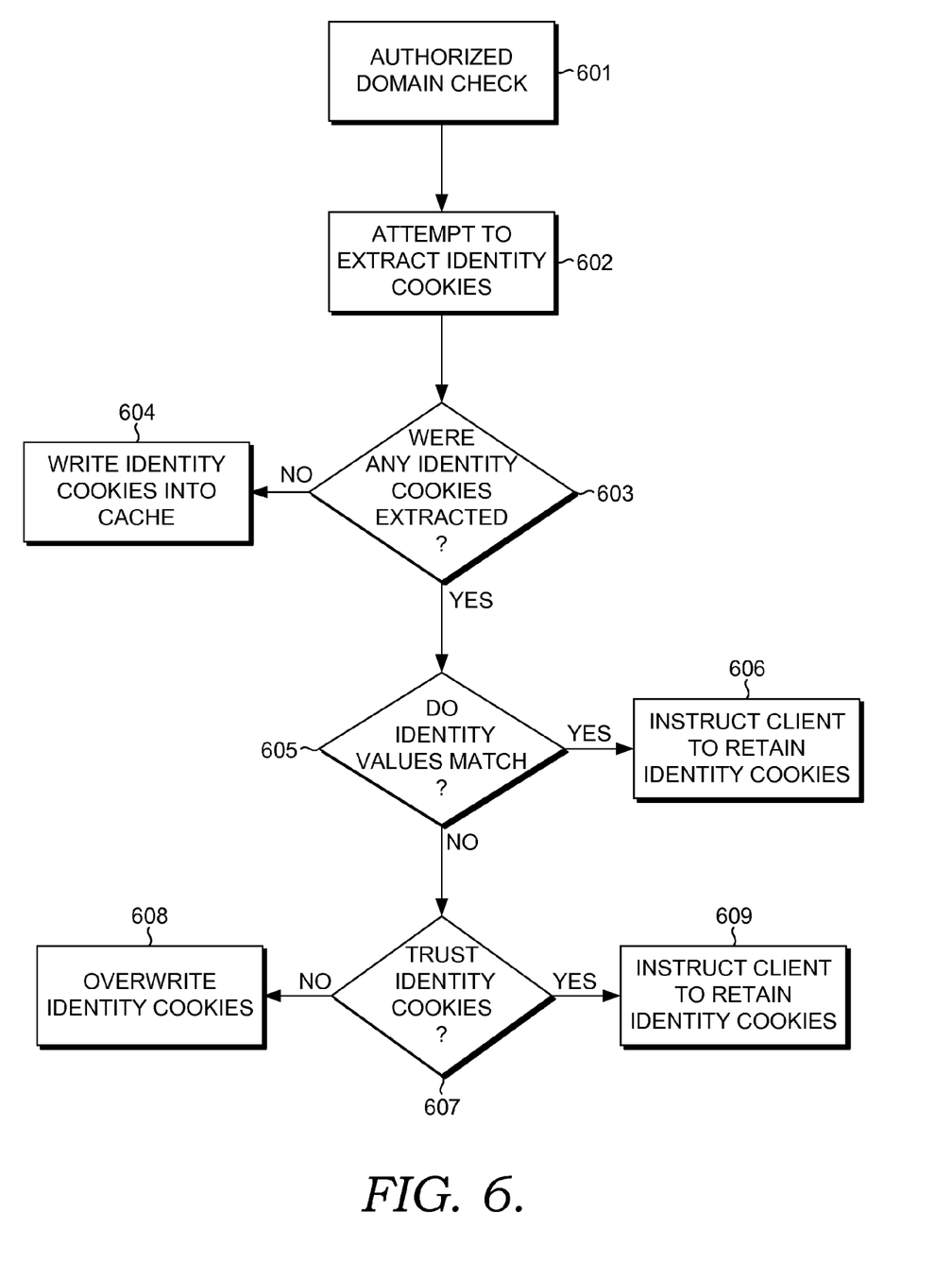
FIG. 6 is a flow diagram illustrating an exemplary method for using a script to generate and persist a user identity at a client in accordance with an embodiment of the present invention.

Turning now to FIG. 6, a flow diagram is shown which illustrates an exemplary method 600 for using a script to generate and persist a user identity at a client in accordance with an embodiment of the present invention. Initially, upon being executed by a client browser, the identity script, at step 601, determines whether the identity script is being executed within an authorized domain. As explained above, in one embodiment, the identity script may check a list of authorized domains that was passed to the client along with the identity script to determine whether the domain in which the identity script is being executed is included on the list. In another embodiment, as described above, the list of authorized domains may be an internal component to the script that is checked at step 601. If the domain is not on the list, the identity script may terminate operation and prevent further attempts to execute within that domain. However, if the domain in which the identity script is being executed is on the list of authorized domains, the identity script executes normally.

At step 602, the identity script attempts to extract any identity cookies that may be stored in the client's cache. If the identity script does not contain hard-coded identity values, i.e. the identity script is empty, the execution of the identity script terminates after extracting any identity cookies that may be stored in the client's cache. However, if the identity script contains hard-coded identity values, the method continues at step 603, wherein the identity script determines whether any identity cookies were extracted from the cache. If there were no identity cookies stored in the client's cache, the identity script writes identity cookies into the client's cache, as shown at step 604. The identity script writes the hard-coded identity value into the identity cookies.

If, at step 603, the identity script determines that one or more identity cookies was extracted from the client's cache, the identity script determines, at step 605, whether the identity value contained in the one or more identity cookies matches the identity value that is hard-coded into the identity script. If the two identity values match, the identity script instructs the client to retain the identity cookies that were extracted from the cache, as shown at step 606.

If the two identity values do not match, the identity script determines, at step 607, whether to trust the identity value contained in the one or more identity cookies. This determination may be performed, for example, by checking variables coded into the identity script that indicate whether the server prefers to persist existing identity values, or whether the server prefers to persist newly detected identity values. If the identity script determines that the identity cookies should not be trusted, the identity script overwrites the existing identity cookies with the identity value hard-coded into the identity script, as illustrated at step 608. However, if the identity script determines that the identity cookies should be trusted, the identity script instructs the client browser at step 609 to retain the identity cookies.

It will be readily appreciated by those skilled in the art that methods similar to the one illustrated in FIG. 6 may be practiced with any number of modifications and may not necessarily be performed in the same order as described in FIG. 6 and the preceding text. The methods described herein are intended to be exemplary in nature and are not intended to be limited to being necessarily performed in the order described herein.

As can be understood, embodiments of the present invention provide for generating user identities within the context of an authorized domain under the control of a server on a client-server network. Identity values may be written by an identity script in identity cookies that are subsequently stored in the client's cache. Further embodiments of the present invention provide applying the methods and techniques described above to persist user identity values by performing cache validation that updates identity values that are hard-coded into identity scripts stored in the client's cache. Still further embodiments of the present invention may be implemented using client and server computing machines or may be implemented on a single machine or a closed network of machines.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media, not being a signal per se, having computer-executable instructions embodied thereon for performing a method for generating and persisting a user identity corresponding to a recognized domain associated with a server in a client-server network, the method comprising:
   requesting content from a server;
   receiving a response from the server, the response comprising an instruction directing the client browser to execute a first identity script, wherein the first identity script comprises one or more identity cookies, wherein each of the one or more identity cookies is associated with at least one identity value corresponding to the first identity script;
   determining whether the first identity script is stored in a cache, the cache being located at the client;
   if it is determined that the first identity script is not stored in the cache, requesting a first identity script from the server, receiving a first identity script from the server, and executing the first identity script received from the server;
   if it is determined that the first identity script is stored in the cache, determining whether the first identity script is expired, executing the first identity script if the first identity script is not expired, and requesting the server to perform a cache validation if the first identity script is expired; and
   storing at least one identity cookie in the cache, wherein the at least one identity cookie is generated by execution of the first identity script.

2. The one or more computer storage media of claim 1, wherein executing the first identity script further comprises executing the first identity script within a closure.

3. The one or more computer storage media of claim 1, further comprising receiving one of a second identity script or a response indicating that the first identity script is no longer expired.

4. A method for generating and persisting a user identity associated with a client in a client-server network, the method comprising:
   receiving at a server a request for an identity script from a client;
   determining whether the request for an identity script includes a first validation header, wherein the first validation header comprises a first identity value corresponding to a cached identity script, wherein the cached identity script is stored at the client;
   determining whether the request for an identity script includes at least one identity cookie;

if it is determined that the request for an identity script includes at least one identity cookie:
- (1) comparing the first identity value associated with the first validation header to a second identity value associated with the at least one identity cookie, wherein the server first determines that the request for an identity script includes at least one validation header and at least one identity cookie;
- (2) generating a second identity script if the first identity value is not equal to the second identity value, wherein the second identity script comprises a reference to the second identity value; and
- (3) transmitting the second identity script to the client, wherein transmitting the identity script further comprises transmitting to the client at least one of a first control header and a second validation header; and if it is determined that the request for an identity script does not include at least one identity cookie, transmitting a response to the client, wherein the response comprises an instruction directing the client to continue using the cached identity script.

5. The method of claim 4, wherein if the request for an identity script does not include a first validation header, the method further comprises generating a third identity script.

6. The method of claim 5, further comprising transmitting the third identity script to the client.

7. The method of claim 6, further comprising transmitting at least one of a second control header and a third validation header.

8. The method of claim 4, wherein if the first identity value is equal to the second identity value, the method further comprises transmitting a response to the client, wherein the response comprises an instruction directing the client to continue using the cached identity script.

9. The method of claim 4, wherein the first control header comprises instructions for directing the client to transmit a request for an identity script and a validation header to the server after a predetermined amount of time.

10. The method of claim 4, further comprising transmitting an authorization list to the client that comprises an indication that the client is allowed to execute the second identity script within the context of the domain associated with the server.

11. The method of claim 10, wherein the authorization list comprises a list identifying one or more recognized domains, wherein each of the one or more recognized domains is associated with a server.

12. The method of claim 4, wherein the second identity script is configured to execute within a closure.

13. A system comprising:
- a computing device operating within a client-server network, the computing device associated with one or more processors and one or more computer-readable storage media, wherein the computing device:
  - (1) receives a request for an identity script from a client and for returning a dynamically generated identity script to the client;
  - (2) generates the identity script in response to the request from the client, the identity script comprising computer-executable instructions for creating one or more identity cookies and hard-coded identity values, the hard-coded identity values being uniquely associated with a single client; and
  - (3) determines whether the identity script should be generated based on comparing at least one first hard-coded identity value with at least one second identity value, wherein the at least one second identity value is associated with at least one identity cookie received from the client.

* * * * *